(12) United States Patent
Kohlmeier et al.

(10) Patent No.: US 10,467,254 B2
(45) Date of Patent: Nov. 5, 2019

(54) METHODS OF SEARCHING THROUGH INDIRECT CLUSTER CONNECTIONS

(71) Applicant: Microsoft Technology Licensing, LLC, Redmond, WA (US)

(72) Inventors: Bernhard S.J. Kohlmeier, Seattle, WA (US); Pradeep Chilakamarri, Seattle, WA (US); Sirui Sun, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 902 days.

(21) Appl. No.: 14/977,281

(22) Filed: Dec. 21, 2015

(65) Prior Publication Data
US 2016/0267166 A1 Sep. 15, 2016

Related U.S. Application Data

(60) Provisional application No. 62/131,097, filed on Mar. 10, 2015.

(51) Int. Cl.
*G06F 16/28* (2019.01)
*G06F 16/22* (2019.01)
(Continued)

(52) U.S. Cl.
CPC ............ *G06F 16/285* (2019.01); *G06F 16/22* (2019.01); *G06F 16/24578* (2019.01);
(Continued)

(58) Field of Classification Search
None
See application file for complete search history.

(56) References Cited

U.S. PATENT DOCUMENTS 6,154,213 A 11/2000 Rennison et al.
7,953,687 B2 5/2011 Simmons et al.
(Continued)

FOREIGN PATENT DOCUMENTS

WO 2011151500 A1 12/2011

OTHER PUBLICATIONS

Mirizzi, et al., "From Exploratory Search to Web Search and Back", In Proceedings of the 3rd Workshop on Ph.D. Students in Information and Knowledge Management, Oct. 30, 2010, pp. 39-46.
(Continued)

*Primary Examiner* — Mark D Featherstone
*Assistant Examiner* — Ranjit P Doraiswamy
(74) *Attorney, Agent, or Firm* — Talem IP Law, LLP

(57) ABSTRACT

By applying a set of simple geometric rules to the connections within a connected graph of 'topics' it is possible to uncover hidden relationships that are otherwise inaccessible to the lay person. Interesting, potentially non-obvious threads of content, termed indirect connection clusters (ICCs), can be found from an online encyclopedia or other graph of articles that are not directly connected to a starting topic, but instead are connected via an intermediate clique of articles. A system performing a search of an information graph can receive a request for identifying relevant content, identify (in a traversal of the information graph) one or more ICCs using a starting topic associated with the request, refine the one or more ICCs (eliminating certain ICCs) and generate a refined set of ICCs, and rank ICCs within the refined set. The ranked ICCs can be provided in response to the request for identifying relevant content.

20 Claims, 7 Drawing Sheets

(51) Int. Cl.
*G06F 16/901* (2019.01)
*G06F 16/2457* (2019.01)
*G06F 16/36* (2019.01)
*G06F 16/35* (2019.01)

(52) U.S. Cl.
CPC ............ *G06F 16/358* (2019.01); *G06F 16/36* (2019.01); *G06F 16/9024* (2019.01)

(56) References Cited

U.S. PATENT DOCUMENTS

| | | | |
|---|---|---|---|
| 8,140,559 B2* | 3/2012 | Bobick | G06N 5/022 707/761 |
| 8,909,653 B1 | 12/2014 | Su | |
| 2012/0136863 A1* | 5/2012 | Bobick | G06F 17/30731 707/737 |
| 2013/0218905 A1 | 8/2013 | Sankarasubramaniam et al. | |
| 2014/0156826 A1* | 6/2014 | Chang | H04L 45/12 709/224 |
| 2014/0282356 A1 | 9/2014 | Mills et al. | |
| 2014/0288910 A1 | 9/2014 | Chandra et al. | |
| 2014/0337306 A1 | 11/2014 | Gramatica | |
| 2014/0365504 A1 | 12/2014 | Franceschini et al. | |
| 2016/0125093 A1* | 5/2016 | Cho | G06F 16/9024 707/798 |

OTHER PUBLICATIONS

"International Search Report & Written Opinion Issued in PCT Application No. PCT/US2016/021414", dated Jun. 3, 2016, 9 Pages.

Deshpande, et al., "Finding Hidden Cliques of Size p N/e in Nearly Linear Time", In Proceedings of Computing Research Repository, Published on: Apr. 29, 2013, 48 pages.

Pei, et al., "On Mining Cross-Graph Quasi-Cliques", In Proceedings of the Eleventh ACM SIGKDD International Conference on Knowledge Discovery in Data Mining, Aug. 21, 2005, 11 pages.

Weissenborn, et al., "Discovering Relations between Indirectly Connected Biomedical Concepts", In Proceedings of 10th International Conference on Data Integration in the Life Sciences, Jul. 17, 2014, 8 pages.

"Knowledge Graph—Innovation in Search", Published on: Dec. 30, 2014 Available at: http://www.ravn.co.uk/technology/knowledge-graph/.

Radford, et al., "(Almost) Total Recall—SYDNEY CMCRC at TAC 2012", In Proceedings of the Text Analysis Conference, Nov. 5, 2012, 6 pages.

U.S. Appl. No. 14/499,195, Bernhard S.J. Kohlmeier, et al., "Productivity Tools for Content Authoring", filed Sep. 28, 2014.

* cited by examiner

METHODS OF SEARCHING THROUGH INDIRECT CLUSTER CONNECTIONS

CROSS REFERENCE TO RELATED APPLICATION(S)

This application claims the benefit of U.S. Provisional Application Ser. No. 62/131,097, filed Mar. 10, 2015.

BACKGROUND

While authoring, creating and editing content within a productivity application, a user may start with a blank page document and then may create, or author, new content. When authoring new content, users may tend to find it difficult to start writing about complex topics—particularly when starting with a blank document, and it may be difficult to generate content without research and assistance. Additionally, the user may desire to research a topic while authoring content to include additional interesting and relevant information. In some cases, the user may desire to research information related to the topic of the created content from within the productivity application where the content is being authored.

Using the context of the document (including content in the document), additional topics can be suggested to the user from within the productivity application and/or through a web application. However, optimizing and providing relevant results can be a challenge; particularly where users are not conducting extensive research (by researching for an extended length of time) or the user does not have significant prior knowledge so that sufficient search terms are provided. Thus, even where relevant information from an online document database, such as an online encyclopedia, of connected articles is provided based on a context of the document and/or terms used in a document, the actual results may be fairly limited to the context and/or terms and may not provide as wide of a range of topics and/or as deep of an understanding as the user may desire unless the user proactively delves deep into the research his or herself.

BRIEF SUMMARY

Techniques and systems for searching and storing information in an information graph are described. By analyzing the geometry of the connections within a connected graph of topics by applying certain simple rules as described herein, it is possible to uncover hidden relationships that are otherwise inaccessible to all but the most expert users in a field.

An information graph can be used to represent a resource of connected articles such as an online encyclopedia. Nodes can be used to represent each article and can be labeled with a title of an article. Edges can be used to indicate that one article includes a link to another article. The information graph can then be used to identify indirectly relevant content (e.g., relevant content that is not directly connected to a topic initially found (or "hit") during a search of the information graph). The techniques and systems described herein use a structure that can be referred interchangeably to as an "indirect cluster connection" or "indirect connection cluster" (for brevity "ICC"). An ICC refers to two nodes that are not directly connected to each other, but instead are indirectly connected only via a connection cluster, which is a group of nodes that meet a specified criteria with respect to their connections.

A system performing a search of an information graph can receive a request for identifying relevant content, identify one or more ICCs in an information graph using a starting topic associated with the request, refine the one or more ICCs to eliminate certain ICCs and generate a refined set of ICCs, and rank ICCs within the refined set of ICCs. The ranked ICCs can be provided in response to the request for identifying relevant content. In some cases, the content of the target node(s) in the refined set of ICCs can be provided in whole or in part instead of, or in addition to, information about the ranking.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
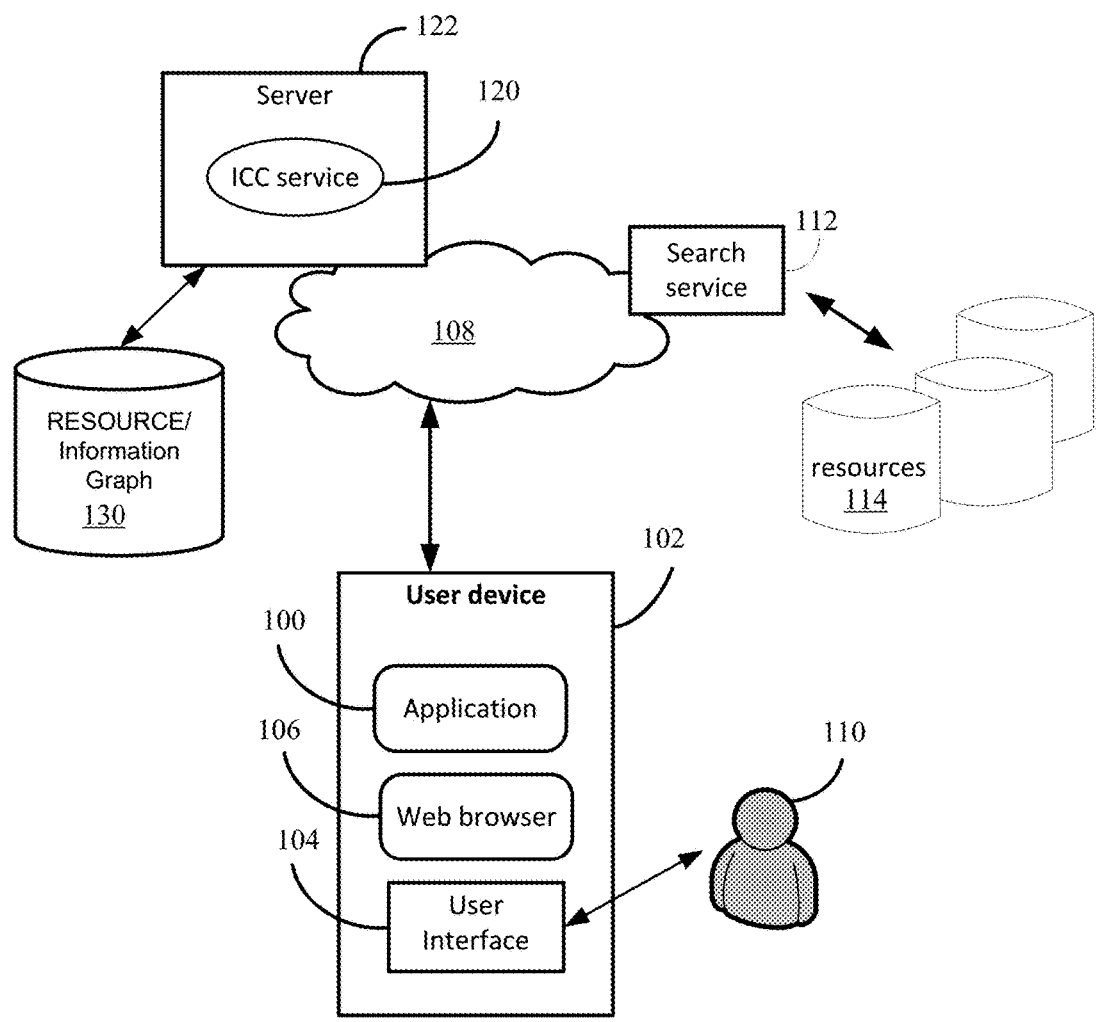
FIG. 1 illustrates a conceptual diagram of an example environment where certain embodiments may be implemented.

Techniques and systems for searching an information graph are described. Through application of the described techniques to the geometry of the connections within a connected graph of topics, it is possible to uncover hidden and indirect relationships between topics and therefore identify potentially useful results with less user effort (and identified search terms) and use of network resources.

In certain embodiments, as relationships between topics are detected during a search process, one or more topics related to an initial topic of interest may be provided to a user to enable the user to discover relevant information related to the initial topic of interest. Information provided through an online encyclopedia such as Wikipedia may lend itself to the described structure and search methods due to its organization of articles that link to other articles. Accordingly, the information captured within online encyclopedia articles and their links (or another online linked article source) can be used in order to suggest interesting, potentially non-obvious topics to users looking to author content through analyzing the connections between the articles.

By modeling an online encyclopedia (e.g. Wikipedia) or other online information source as an information graph, interesting, relevant, and potentially non-obvious threads of content may be found. This content may not be directly connected to a starting topic initiating the search, but are instead connected via an intermediate cluster of articles. These sorts of connections (e.g., those resulting from an intermediate cluster of articles) may be referred interchangeably to as an "indirect cluster connection" or "indirect connection cluster" (for brevity "ICC"), where an ICC may suggest interesting connections and story arcs which otherwise could only have been discovered through extensive research or prior knowledge. In some cases, by using ICCs, topics that may be even be indiscoverable by a traditional search system can be identified.

An ICC refers to two nodes that are not directly connected to each other, but instead are indirectly connected only via a connection cluster of nodes. The connection cluster is a group of nodes that meet a specified criteria with respect to their connections. In one implementation, the connection cluster is a size-N clique where the N nodes are all interconnected to each other. Other implementations can include variants for the connection cluster criteria such as where each node is only connected to two other nodes or where all the nodes in the connection cluster connect to one central node.

In the following detailed description, embodiments are described and references to accompanying drawings are made to facilitate description of the various embodiments. The drawings may provide some specific embodiments and examples, but other examples may also be implemented, and aspects may be changed and/or combined without departing from the scope of the disclosure as described herein.

FIG. 1 illustrates a conceptual diagram of an example environment where certain embodiments may be implemented. Referring to FIG. 1, in an example scenario, when authoring content in a productivity application 100 executed at least in part at a computing device 102, a user 110 may also (via a user interface 104 of the same computing device 102 or another computing device from that executing the productivity application 100) conduct research using the Internet or other network(s) 108. For example, the user may actively research topics via a web browser application 106 or, when available, via the productivity application 100, by submitting a query or terms for searching online content and article databases (e.g., using a search service 112 that may search various resources 114 of content and/or indexes for a list of sites). In some cases, the productivity application 100 may have online research capabilities that conduct a search on behalf of a user based on context (and content) within the productivity application 100 or key terms or other selections input by the user 110 for requesting relevant content within the productivity application 100.

However, the application's search results may be limited (in depth and/or relevance) by a shallow knowledge base of the user (and the terms or content known or authored by the user), and the user may desire to discover additional articles about topics that may be relevant to the user's topic of interest but that the user may not discover through his or her own research. For example, some topics may be indirectly related to the user's topic of interest and would not be obvious to the user (even when a search engine has various knowledge bases to generate additional terms) to specifically query for and incorporate into his or her research. Indeed, in some cases, a traditional search engine and query could not uncover the topics.

According to certain implementations, an ICC service 120 is provided to facilitate the identification of relevant results and improve the search capabilities of local and/or cloud-based applications. In some cases, the ICC service 120 can be implemented at a server 122 (which may include virtual and physical resources). Server 122 may be implemented as described with respect to computing system 900 of FIG. 9. In some cases, some or all of the ICC service 120 can be implemented at a user's computing device (e.g., device 102). User computing device 102 may be a desktop computer, a laptop, a tablet, a smart phone, a wearable device (e.g., glasses or watch), or other computing device (any of which may be implemented as described with respect to computing device 800 of FIG. 8).

The productivity application 100 may include a word-processing application, a spreadsheet application, a presentation application, or other similar application enabling users to create, modify and, in some cases, share content. In some cases, the productivity application 100 can be or include a mobile research companion. Where the productivity application 100 includes a feature for performing context and/or content based searches of various resources for content that could be helpful for a user to include in a document being authored within the productivity application 100, the productivity application 100 can communicate with the ICC service 120 to request for and receive content (that may be relevant and even non-obvious based on the information corresponding to a user's initial topic of interest provided with the request) based on the results from the ICC service 120. In some cases, certain aspects of the productivity application 100 can be a web application (executed on a server) and accessed over a network 108, for example, via a web browser (such as web browser 106).

The ICC service 120 can perform various processes accessible through an application programming interface (API). These processes can be carried out by modules, or components, executed at the server 122 (or other computing device). In some cases, the ICC service 120 can be implemented by an ICC search system (such as described with respect to FIG. 4). The ICC search system can be embodied as server 122 or some other computing device such as described with respect to FIGS. 8 and 9.

In some cases, a request to the ICC service 120 includes a topic to initiate the search. In some cases, the request contains content from the productivity application 100 from which one or more topics are identified. The request may also include cluster attributes. For example, when an ICC is defined using a size-N clique, the cluster attributes can include a clique size or data that the search component can use to determine an appropriate clique size. Of course, in some cases, an ICC search component of the ICC service 120 can use a default clique size.

As briefly discussed above, the information captured within curated and ingested knowledge graphs such as online encyclopedia articles and their links (or another online linked article sources) can be used by a productivity application (or other application) in order to suggest interesting, potentially non-obvious topics to users looking to expand their knowledge or author content. An online encyclopedia (e.g. Wikipedia) or other online information source or content repository can be modeled as an information graph data structure and stored at a storage resource 130 (which may be implemented as a computing system 900 or a virtual or physical component thereof), and the information graph may be accessed by the ICC service 120 to search for content.

In some cases, the ICC service 120 can generate an information graph for an article source, such as an online encyclopedia, where nodes of the information graph represent an article about a specific topic and edges represent links between articles. This process of generating the information graph for the article source is described in more detail in the example entitled "Modeling Wikipedia as a Graph".

Figure 2:
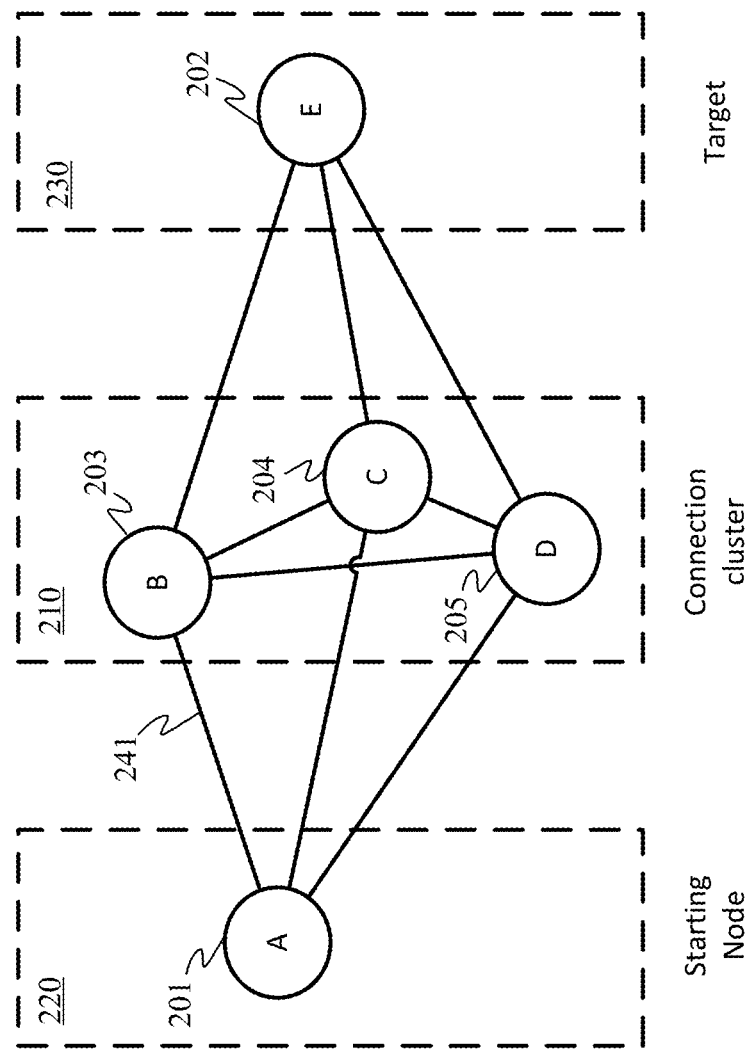
FIG. 2 illustrates an indirect connection cluster of an information graph data structure.

Relevant and potentially non-obvious threads of content may be identified from the information graph, where the threads of content may not be directly connected to the starting topic, but which are instead connected via an intermediate clique of articles (or other content), described in more detail with respect to FIG. 2.

FIG. 2 illustrates an indirect connection cluster of an information graph data structure. As briefly mentioned above, an online encyclopedia or other online information resource with connected content may be modeled as an information graph data structure. As part of the graph data structure, articles can be represented as nodes with edges between nodes indicating that the articles (or other content) represented by those nodes are connected (e.g., via selectable links, citations, or other indicators of a relationship). Using this graph data structure, a set of ICCs that meet a specified criteria (e.g., topic for starting node, clique size, clique definition/criteria, etc.) can be identified.

In an embodiment, provided in detail herein, the rules applied when analyzing the geometry of the connections within a connected graph of topics include defining an ICC as a cluster, or set, of nodes, where a starting node is connected to a target node only through a subset of nodes that form a size N clique. In this embodiment, the members of the size N clique are each also connected to the starting node and the target node, but the starting node is not directly connected to the target node and there are no other nodes outside of the clique that are connected to both the starting node and the target node. As mentioned above, clique variations may be applied. However, the following rules (using the clique definition of a group of nodes that are all interconnected to each other) may formally define an embodiment of the ICC: Given an information graph (G) having a starting node A 201 and target node E 202, the nodes A 201, B 203, C 204, D 205 and E 202 form an ICC of size 5 if the following criteria hold true:

Node A 201 is connected to B 203, C 204 and D 205
Node A 201 is not connected to node E 202
Nodes B 203, C 204 and D 205 form a clique
Nodes B 203, C 204 and D 205 are all connected to E 206
In graph G, there does not exist another node X that is connected to A 201 and also connected to E 202 (where X≠B 203, C 204, or D 205)

In this context, nodes X and Y are considered connected if X links to Y inclusive or Y links to X. A constraint for an ICC is the size of the clique which forms the connection cluster. The clique of nodes between A 201 and E 202 form a connection cluster 210. Node A 201 is the starting node 220, and node E 202 is the target 230.

As size of the ICC increases, there remains one starting node 220 and one target 230, but the size of the connecting clique (in the connection cluster 210) of the ICC increases. Therefore, an ICC of size 6 has a clique (in the connection cluster 210) of size 4 connecting the start node 220 and the target node 230; whereas the ICC of size 5 has a clique of size 3.

In a system according to certain embodiments, given an online database of articles modeled as an information graph of nodes representing articles connected by edges representing whether at least one of the two connecting articles contain a link to the other, a plurality of ICCs may be identified from within the information graph based on an initial starting topic. For example, one or more starting nodes may be identified (e.g., by an ICC service 120) in the graph based on a received initial topic from content provided by a productivity application (e.g., application 100) (or other application requesting relevant articles).

In the underlying graph structure, if node A 201 links to node B 203, an edge 241 is provided between A 201 and B 203. As mentioned briefly above, articles (or other content) of an online encyclopedia or other online information resource with connected content can be represented as nodes with edges between nodes indicating that the articles (or other content) represented by those nodes are connected. In some cases, each node may be named after a title of the article, and each node may include metadata with additional information about the article, such as article length, sections, images, date, author information, and/or other useful metadata.

Where an edge is used to indicate that two articles are connected because at least one of the articles links to the other (e.g., via a hypertext link in a portion of content that, when selected, navigates to the other article), the edge can indicate directionality of the linking (e.g., which article is referenced and which article does the references). For example, edge 241 between A 201 and B 203 can contain information about whether an article represented by node A 201 links to an article represented by node B 203, the article represented by node B 203 links to the article represented by node A 201, or that the two articles represented by nodes A 201 and B 203 link to each other. The information regarding directionality of the links may be accomplished, for example, through metadata on the edge or through using directed edges.

Figure 3:
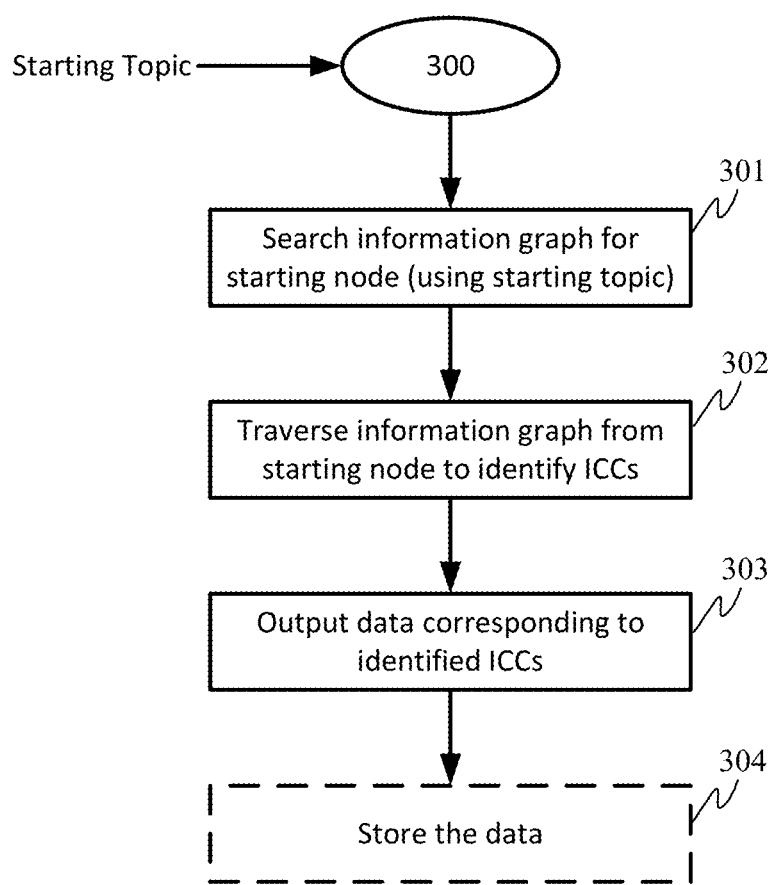
FIG. 3 illustrates an example process for identifying ICCs.

FIG. 3 illustrates an example process for identifying ICCs. Referring to FIG. 3, the process 300 for identifying ICCs can begin when a starting topic is received. Process 300 may be carried out by an ICC search component executed at the server 122 or other ICC search system. The starting topic can be one or more words (e.g., key terms), a phrase, a specified entity, or other text that can be used to search an information graph. The starting topic can be identified from content input by a user in a productivity application either as part of a service that requests the search for ICCs or by the ICC search service based on the content received as part of the request. Using the starting topic, at least one starting node can be identified from the information graph, for example, by searching the information graph for a starting node (301).

The search for starting nodes can be accomplished through any suitable method for identifying potentially relevant information, for example, as used by typical search engines to identify content corresponding to a search query. The graph can be searched to identify nodes having titles or other metadata that meet the search criteria (e.g., matching terms). These initial results for starting nodes can be considered the "hit". From the "hit" of a starting node, the information graph can be traversed (302). The graph can be traversed or "walked" to identify any sets of nodes consisting of the starting node, a connection cluster, and a target node.

The cluster attributes used to identify the sets of nodes (the ICCs), can be part of the specified ICC criteria. The specified ICC criteria may be specified by the request, determined based on information included with the request, provided as part of the program instructions for identifying ICCs, or a combination thereof. Thus, while traversing the graph from a starting node, ICCs having the specified cluster attributes such as clique size, type of clique members and the defining features described above can be identified and corresponding data output (303). In addition, in some cases, the graph data structures, with directionality and/or weights, can be traversed to find particular paths from a source node to a target node along edges through one or more connecting nodes.

In some cases, at operation 303, the set of nodes forming the ICC can be output. In some cases, the content represented by some or all the nodes may be output. For example, in some cases, such as when the information graph represents an online encyclopedia or linked articles, the target article name from the target node of an ICC can be output, and optionally some text can be included from the target article and/or some text from one or more connector articles can be included as output. The output data may be provided in response to the request or further processing may be carried out to refine and/or rank the results before being provided in response to the request.

In some cases, for each ICC identified during the traversing of the information graph, the target article name corresponding to the target node and at least one connector article name from the "connector" nodes of the connection cluster between the starting node and the target node can be stored, for example, in a list form (304). Other information, such as available associated with edges in the graph may be stored in the list as well. Examples of information that may be stored associated with an edge or a node connected with the edge include, but are not limited to, a link overlap score (described below), number of edges connected to each connector node in the connection cluster, and direction of each of the edges for each connector node. The data structure for the list can be any suitable structure for a set of data with associated attributes on which actions such as ordering can be carried out. The list may include rows and columns or have some other manner of organization.

Through the ICC construct, the information graph can then be used to identify indirectly relevant content (e.g., relevant content that is not directly connected to a topic initially found (or "hit") during a search of the information graph).

Figure 4:
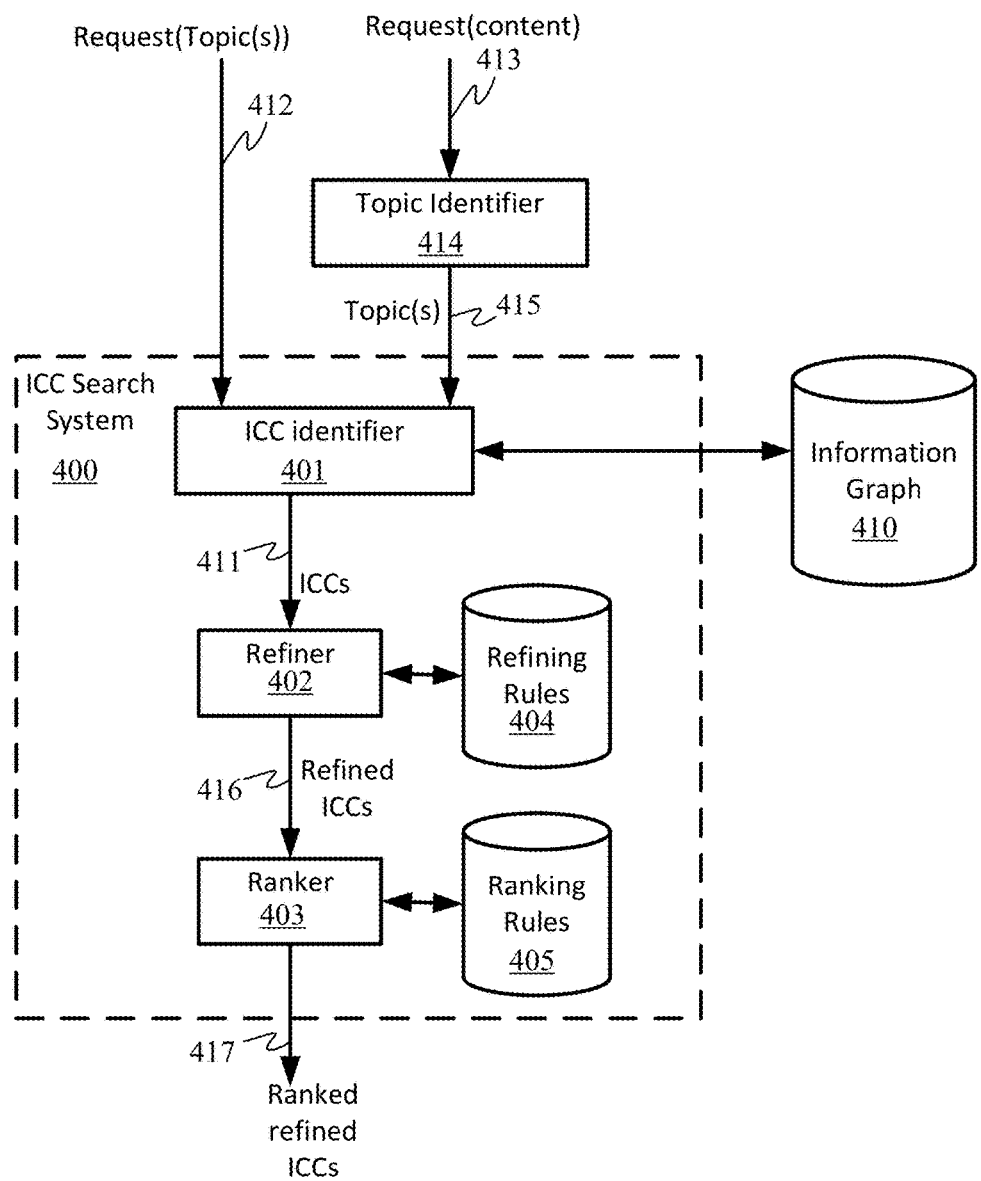
FIG. 4 illustrates a conceptual diagram of an example ICC search system that may provide an ICC service.
Figure 5:
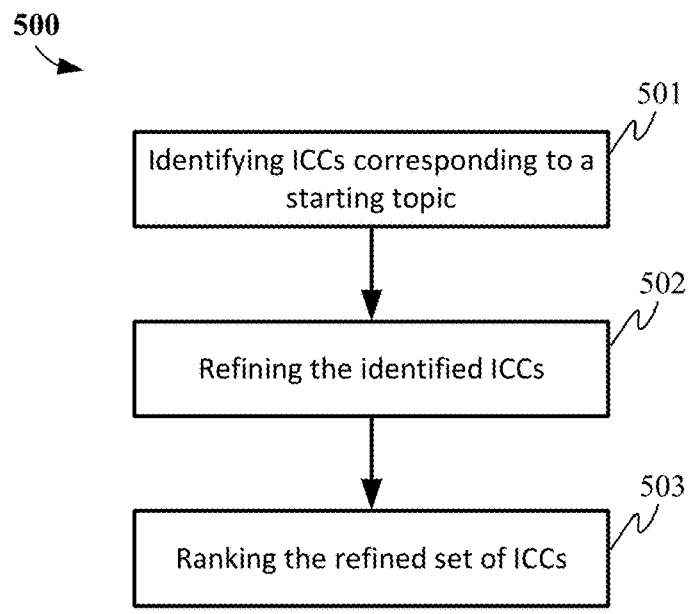
FIG. 5 illustrates a process that may be carried out by an ICC search system.

FIG. 4 illustrates a conceptual diagram of an example ICC search system that may provide an ICC service; and FIG. 5 illustrates a process that may be carried out by the ICC search system.

An ICC search system 400 can include various components, including an ICC identifier 401, a refiner 402, and a ranker 403. The ICC search system 400 can also include one or more storage resources to store refining rules 404 and ranking rules 405 (as well as clique member attributes). In addition, the ICC search system 400 can include or communicate with external storage resources storing an information graph 410. In an example embodiment, given a starting node A identified by the ICC identifier 401, an ICC component of the ICC identifier 401 may return a list of all ICCs 411 meeting the search criteria. The list of ICCs 411 can be refined and ranked (e.g., via a refiner 402 and ranker 403) before being provided (as ranked refined ICCs 417) to a productivity application (or other application from which the request originated) for presentation in some manner to a user. In some cases, a target article name of a target node and at least one connector article name between the starting node and the target node can be provided.

The ICC search system 400 may be embodied as any suitable computing system, and may support an ICC service (e.g., service 120) by providing the functionality accessed via an API for the ICC search service. Input to the ICC search system 400, such as a topic to search, may be given as part of a request (e.g., from a productivity application or other application). In addition, some input to the ICC search system 400, such as clique size, clique member attributes, and various rules, can be based on data stored for access by the ICC search system 400 (or other system that may communicate with the ICC search system for purpose of providing the input) so that the ICC search system 400 may carry out its various processes.

For example, referring to FIG. 5, the ICC search system 400 can perform a process including identifying ICCs corresponding to a starting topic (501); refining the identified ICCs (502) to eliminate certain ICCs and generate a refined set of ICCs; and ranking ICCs within the refined set of ICCs (503). Step 501 may be carried out by the ICC identifier 401 and can involve performing process 300 such as described with respect to FIG. 3.

An input to the search system 400 (or search component of the ICC identifier 401) may be a name of a starting node (e.g., a starting node title) or sufficient information to identify a starting node that may be relevant. For example, a request with one or more topics 412 may be received by the ICC search system 400 and used by the ICC identifier 401 to search the information graph 410 for relevant starting nodes. The search for the starting nodes may be accomplished through various searching algorithms including, but not limited to, those that traverse the graph in some manner. In some cases where the request does not specify a topic, but instead includes content 413 (e.g., natural language, user expression, context, and/or a selection of authored content from a productivity application), a topic identifier 414 can be used to identify topic(s) 415 that are provided to the ICC search system 400 for use by the ICC identifier 401.

The ICC identifier 401 can include logic or software, that when executed, direct the ICC search system 400 to traverse an information graph 410 (that may be stored on a local or remote storage resource) to output one or more ICCs 411 related to an identified starting node, where the ICCs are identified by finding sets of nodes within the information graph model which meet criteria of an ICC. In examples, the output includes a list of the one or more ICCs 411. Each entry in the list that may be output by the ICC identifier 401 may include one or more of: a target article name; a nature of the connection between target and the nodes forming the connection cluster (e.g., link overlap and a directionality); names of the connector/intermediary articles corresponding to the nodes forming the connection cluster; for each connector/intermediary article, a nature of connection between connection cluster node and starting node (e.g., link overlap score and directionality); and in some scenarios a portion of text of at least one intermediary article surrounding a connection to the target article.

In the information graph 410, each edge can further have an edge value associated therewith. The edge value can be considered a weight that may be used during ranking or refining of the ICCs. Since each node can represent an article, the edge value assigned to the edge between two nodes can be used to represent the similarity of the two articles represented by connected nodes. In some cases, the weight (edge value) can be based on term and link frequency as well as term frequency-inverse document frequency (Tf-idf).

In an example embodiment, to measure similarity, a metric referred to as link overlap is utilized. Link overlap is a measure of node similarity and attempts to find a quantitative measure for how relevant two articles are to each other. Intuitively, link overlap is a score of how many outbound links two articles have in common. Accordingly, a link overlap score can be added as a weight for each edge.

As will be discussed further in detail below, the link overlap score may also be used to rank one or more output ICCs.

There are a number of methods for determining the link overlap score between a pair of nodes. Some example methods of calculating a link overlap score $L_{A,B}$ between two nodes A and B include, but are not limited to:

$$L_{A,B} = \frac{size(S_A \cap S_B)}{size(min(S_A, S_B))}, \quad \text{(method 1)}$$

$$L_{A,B} = \frac{size(S_A \cap S_B)}{size(max(S_A, S_B))}, \quad \text{(method 2)}$$

$$L_{A,B} = \frac{size(S_A \cap S_B)}{size(S_A)}, \text{ and} \quad \text{(method 3)}$$

$$L_{A,B} = size(S_A \cap S_B), \quad \text{(method 4)}$$

where $S_A$ is a set of outbound links from node A, $S_B$ is a set of outbound links from node B, size(x) finds a size of set x, $min(S_A, S_B)$ returns a smaller of the two sets, and $max(S_A, S_B)$ returns a larger of the two sets.

As an example calculation, given node A links to {B, C, D, F}, node B links to {C, D, E, G, H}, when method 1 is used to find the overlap, the result is as follows:

$$L_{A,B} = \frac{size(\{C, D\})}{size(S_A)} = \frac{2}{4} = .5.$$

It should be understood that these described metrics are but one way to weigh and rank the strength of node connections in the graph. There are multiple formulas that may be used for calculating link overlap score, however the formulas (methods 1-4) are representative of some example calculations. In some cases, the method for calculating link overlap score can be indicated by an identifier. This identifier (indicating the link overlap method to be applied) can be used, in some cases, as one of the inputs to an ICC search component.

The ICC search system 400 may either perform calculations itself to find link overlap between nodes, or the ICC search component of the ICC identifier 401 may traverse the information graph that already has edges weighted with the link overlap score. In some cases where the ICC search system 400 performs calculations to find the link overlap score itself (either before, during, or subsequent to the refining step depending on when the link overlap score is needed), the particular method used to calculate the link overlap score may also optionally be taken as an input to the ICC search system 400. As mentioned above, the ICC search system may take an input parameter indicating which of known formulas are used in calculating link overlap score. Otherwise, a default one or more link overlap formulas may be used. Another input that may be taken by the ICC search system may be an ICC size range, which is a range of sizes for the ICCs that are being looked for (e.g., size range of 5-6, which corresponds to cliques of size 3 and 4).

Step 502 may be carried out by the refiner 402. The refiner 402 uses one or more refining rules 404 to eliminate certain ones of the ICCs 411 identified by the ICC identifier 401. In some cases, thousands or millions of results (e.g., ICCs 411) may meet the input criteria (of ICCs including a starting node relevant to a topic provided with a request), and it may be beneficial to narrow down the results to present a manageable list of relevant and interesting ICCs to the user that they may consider. The refiner 402 can carry out processes to reduce a quantity of ICCs 411 output from the ICC identifier 401. The refiner 402 (or refining module/component) may take into account a number of considerations in order to eliminate certain ICCs and reduce the quantity of ICCs ultimately used to provide relevant content in response to the request. The rules can include, but are not limited to, class elimination (through learning or pre-assigned classes), rules concerning the direction of edges (e.g., whether and how many are outgoing, whether and how many are incoming), rules concerning proximity of entities within an article, rules concerning physical attributes of each node, rules concerning physical attributes of groups of nodes, rules including cluster size elimination, rules including a link overlap threshold, and combinations thereof. For example, a rule can be "if edges of a node have directionality of being outbound only, don't apply size rule".

In some cases, the refiner uses known types and patterns to identify the ICCs that include a target that would most likely be of interest to the user. Certain node types, such as those with many connections to other nodes (e.g., overconnected nodes, very-interconnected nodes, or "large" nodes with high numbers of inbound connections) can be removed from consideration since it is assumed that the more interesting information would be found from nodes that do not have a large number of connections.

The refiner 402 can consider a size of a connecting node (e.g., a number of connections representing hypertext links to and from other articles). The size of the connecting nodes may be considered because a smaller node size, or a tighter cluster within the clique (or other format of the connection cluster) may provide more quality suggestions. For example, the size of the node may indicate a number of articles referenced by the node article, so if there are three large nodes in the clique, then there is a high probability of them linking to each other, but if there are three small nodes in the clique, then they are less likely to connect to each other, and the signal may be stronger.

In some cases, the refiner 402 can consider the relative sizes of the nodes in the connection cluster of an ICC. For example, a refining rule that the refiner may apply could be that at least one of the nodes in the connection cluster is a very small sized node ("very small" is being used to illustrate a point since the refining rule would use an actual number, which may have been experientially identified as providing useful results). The refiner 402 can consider a proximity of connecting links within an article (e.g., how close the links are and/or the entities corresponding to the links are in the text of an article). The proximity may also be predefined or learned based on observed user behavior. Link overlap may also be considered, where any nodes having a link overlap score over or under a certain value may be eliminated based on a predefined, learned, and/or customized link overlap rule. Link overlap score can be used by the refiner 402 by, for example, setting a threshold of which one or more of the nodes of an ICC must meet or exceed (or, conversely, not reach). The rules (and combinations of rules) applied by the refiner can be predefined, learned, and/or customized by a user.

Specific topics can be eliminated as well. For example, if a node represents a country as a topic, the ICC can be eliminated. The type of node to be eliminated may be based on a predefined rule, or may be learned over time based on observation of user selections. The proximity of connecting links may be considered to provide a broader or tighter range of connections, depending on the defined proximity rule.

These and other refining rules 404 can be stored in a storage resource of the ICC search system 400 and accessed by the refiner 402. The rules may be updated and adjusted as desired.

The above refining rules are not intended to be limiting but are exemplary of a number of considerations that a refining module may take into account in order to eliminate results from a large output list of ICCs.

After refining the output list of ICCs to provide a manageable list of ICCs (refined ICCs 416) for a user to consider, the list of ICCs may also be ranked based on a number of considerations. Here, operation 503 can be performed by the ranker 403, using ranking rules 405 to output ranked refined ICCs 417. Some of the considerations used for refining the results may also be used to rank the results. For example, some ranking considerations may include, ranking ICCs by a number of occurrences of a particular intermediary or target node, ranking by node type, node size, link overlap score, direction, and/or proximity of connections. As previously discussed, there are multiple formulas that may be used for calculating link overlap score. The refining rules and ranking rules may be stored on a same or different storage resource of the ICC search system 400.

It should be understood that these described metrics, considerations, and rules are but one way to refine, weigh, and rank the strength of node connections in the graph. Other considerations for ranking the list of ICCs may also be considered in addition to or in place of the above described considerations, and the described considerations are intended to be exemplary of some ranking approaches.

Figure 6:
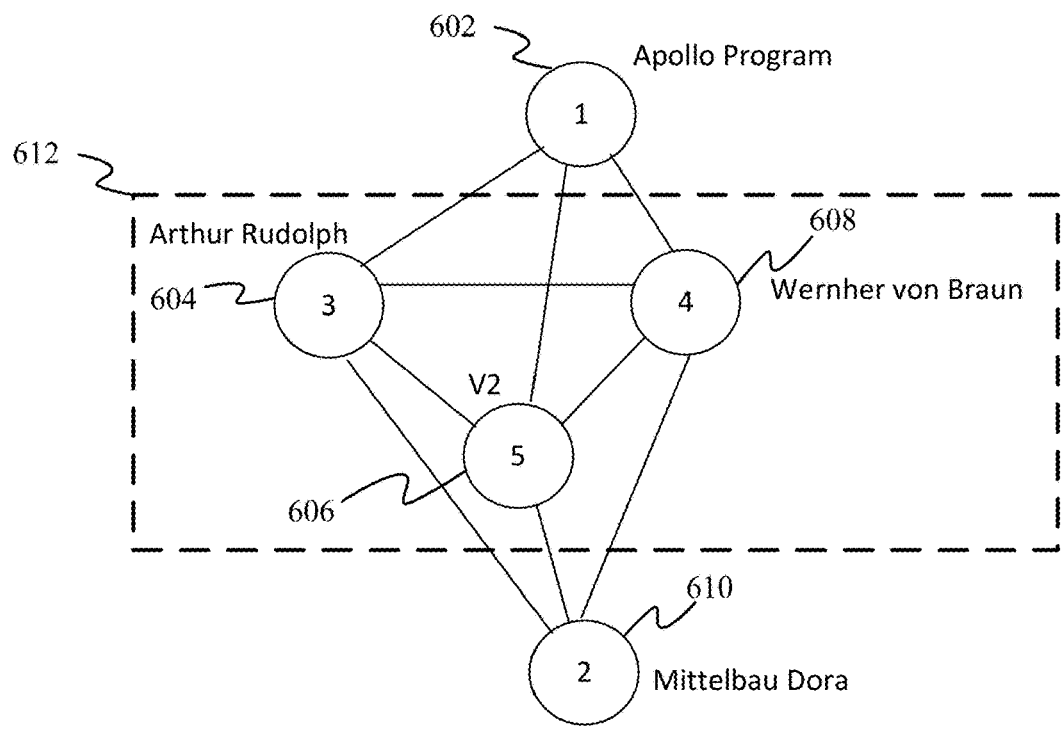
FIG. 6 illustrates a subset of an information graph generated from an online encyclopedia produced as an output ICC.

In the ICC of FIG. 6, Apollo Program 602 is the starting node and the three connector nodes, Arthur Rudolph 604, Wernher von Braun 608, and V-2 Rocket 606 indicate a target node of Mittelbau-Dora 610. The first and last articles (nodes 1 and 2) directed to the topics of Apollo Program 602 and Mittelbau Dora 610 represent the starting node and the target node, and the middle three articles (nodes 3, 4, and 5) directed to the topics of Arthur Rudolph 604, Wernher von Braun 608, and V-2 Rocket 606 represent connector nodes, or the nodes of the connection cluster 612.

This example illustrates the ability to uncover the relationship between the Apollo program and Mittelbau Dora, a concentration camp where rockets were produced under horrific circumstances in Nazi Germany. In particular, the connection cluster 612 may present an interesting story thread leading from the Apollo Program: Arthur Rudolph and Wernher von Braun were the lead scientists who worked first on the V-2 rocket for Nazi Germany, and eventually took their expertise to the American space program. The Mittelbau-Dora target is a concentration camp where prisoners worked on the V-2 rockets. Taken together, this forms a narrative of how the American space program is related to activities at a concentration camp, which may not have been an obvious connection to the user when starting out with interest in writing about the Apollo Program.

The following Table 2 shows an example entry of an ICC table that was output for the above "Mittelbau-Dora" example using an implementation of an ICC search component, given "Apollo Program" as the starting node:

TABLE 2

| | | | | Output ICC Apollo-MD | | | | | |
|---|---|---|---|---|---|---|---|---|---|
| Target (T) | T-C1 edge | T-C2 edge | T-C3 edge | Connector (C1) | C1-Starting node edge | Connector (C2) | C2-Starting node edge | Connector (C3) | C3-Starting node edge |
| Mittelbau-Dora | Link overlap: .11 Direction: A->B and B->A | Link overlap: .06 Direction: A->B | Link overlap: .22 Direction: A->B and B->A | Wernher von Braun | Link overlap: .17 Direction: A->B and B->A | Arthur Rudolph | Link overlap: .16 Direction: B->A | V-2 Rocket | Link overlap: .21 Direction: A->B |

Advantageously, the provided list of ICCs may signify a meaningful connection between nodes that may not be otherwise discoverable by a user.

Clearly, in some cases, through productivity and/or content authoring applications using certain implementations of the described techniques and systems, users can write better content faster. Interesting, potentially non-obvious topics can be suggested, given an input topic, through the described indirect cluster connections, enabling a user to uncover hidden relationships between topics without being an expert in the field of research.

FIG. 6 illustrates an example subset of an information graph generated from an online encyclopedia produced as an output ICC.

In the following real-world example, an ICC is generated from an information graph modeling Wikipedia. Suppose the user has expressed the intent to write about the Apollo Program. Someone not familiar with the topic may have a difficult time putting content into context and uncovering non-obvious relationships between topics. Using the "Apollo Program" as a starting topic (and as the starting node), an ICC of clique size=3 was uncovered as shown in FIG. 6. This graph is represented as G=(N,E) where the nodes N={1,2,3,4,5} and the edges E={{1,3}, {1,4}, {1,5}, {2,3}, {2,4}, {2,5}, {3,4}, {4,5}, {5,3}} and not {1,2}.

The ICC of Table 2 is exemplary of one output ICC entry from starting node Apollo Program. An example full ICC output list may include one row for every ICC with the Apollo Program as the starting node. Each entry may include a link overlap score and a directionality of each edge between the starting node and each connector node, and the target node and each connector node. Furthermore, refining and ranking as described above may be applied to present the most relevant and interesting non-obvious ICCs to the user or client application, and to present them in a ranked order according to predefined or customized rules as previously discussed.

In some embodiments, the output list may provide more detailed information such as an article name of each of the intermediary connector articles and an article name of the target article. Additionally a portion of text from at least one intermediary article may be provided, where the portion of text is a portion of text surrounding a hyperlink connecting the intermediary article to one of the starting node or the target node to illustrate how the articles are connected. For example, a sentence in the starting node article may be "The design, development and construction of the center was conducted by Kurt H. Debus, a member of Dr. Wernher von Braun's original V-2 rocket engineering team." The italicized terms in the previous sentence represent hyperlinks connecting the starting node article to two of the intermediary connector articles. The sentence may be provided to demonstrate the connection to the user.

Figure 7:
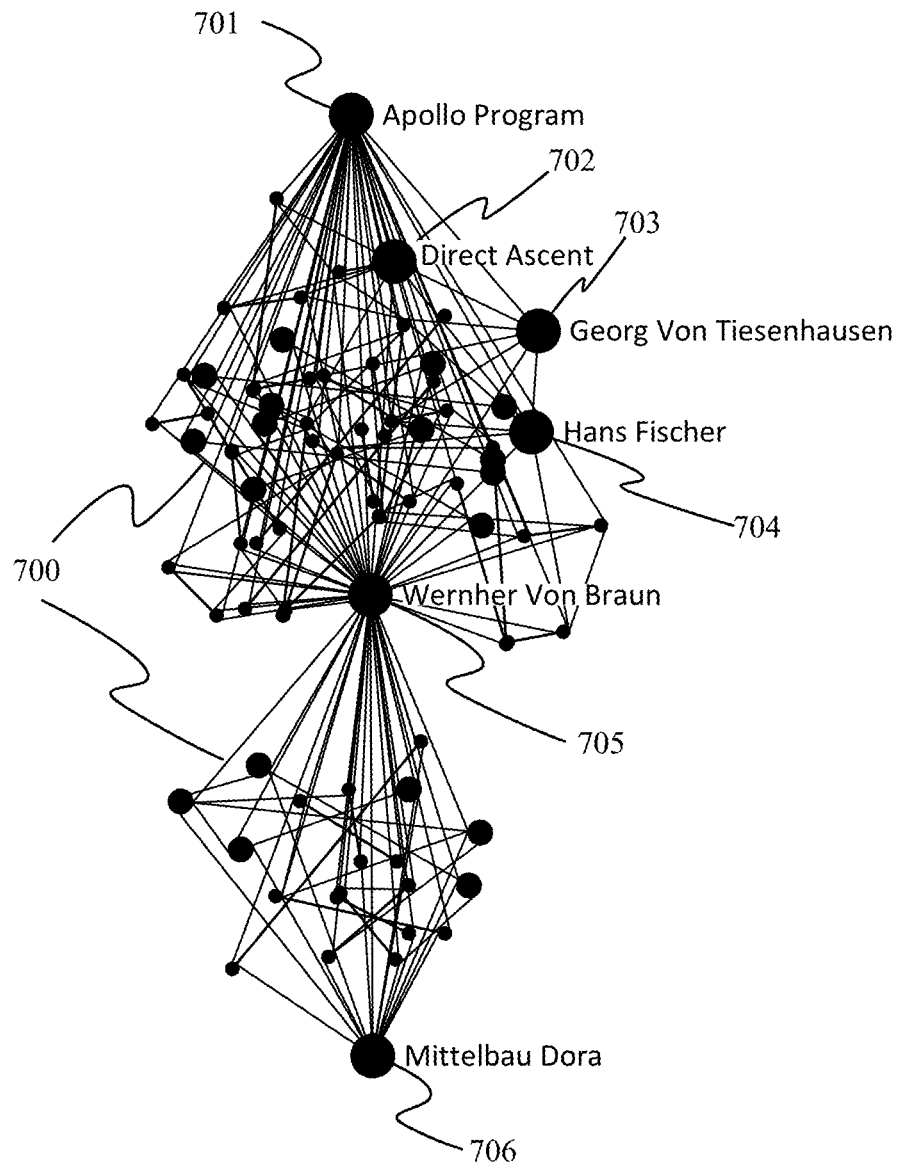
FIG. 7 illustrates application of an ICC search component traversing an information graph generated from Wikipedia.

FIG. 7 illustrates an example application of an ICC search component traversing an information graph generated from an online encyclopedia. There may be multiple patterns of cross linkage 700 in an information graph of an online encyclopedia that represent candidates for non-obvious relationships between topics (the ICCs). The Apollo program 701 can have links to numerous articles with topics including "Direct Ascent" 702, "Georg Von Tiesenhausen" 703, "Hans Fischer" 704 and "Wernher Von Braun" 705. The multiple patterns of linkage 700 may be traversed by the ICC search component to identify one or more ICCs meeting predefined input criteria, for example, having a clique size of three. In this example, it can be seen that the traversal includes walking from the node "Apollo Program" 701 to the node "Wernher Von Braun" 705 and the various nodes (and patterns of cross linkage) from the node "Werner Von Braun" 705 to arrive at possible target nodes. Here, the node "Mittelbau Dora" 706 meets the criteria for a target node (although the connection cluster is not identified in the Figure).

Modeling Wikipedia as a Graph

The following describes how Wikipedia and other online encyclopedias (or linked articles) can be modeled as a graph that contains ICCs.

Articles as nodes: Nodes in a Wikipedia graph represent individual Wikipedia articles. Each node is named after the title of the Wikipedia article. The data model can also be extensible such that nodes can have other article metadata (e.g. article length, sections, etc.).

In the example Wikipedia graph model, articles which are meaningless in and of themselves, but which serve simply as lists of other articles are not added to the graph. Articles of this nature may include, but are not limited to: category pages (e.g. http://en.wikipedia.org/wiki/Category:History_of_Spain); articles of category "Lists" or "Lists of Lists" (e.g. http://en.wikipedia.org/wiki/List_of_multiple_Olympic_gold_medalists); timelines or indices of particular topics (e.g. http://en.wikipedia.org/wiki/1967_in_aviation, http://en.wikipedia.org/wiki/Index_of_philosophy); and articles specifically for dates (e.g., http://en.wikipedia.org/wiki/January_31).

Links as weighted edges: Edges in the Wikipedia graph represent a link from one Wikipedia article to another. If node A links to node B, an edge is provided between A and B. Edges also keep track of directionality of the links. For example, an edge between A and B contains information about whether A links to B, B links to A, or A and B link to each other. The directionality of the links may be accomplished, for example, through metadata on the edge or through using directed edges.

In some cases, a similarity score is added as a weight for each edge during the initial modeling of the online encyclopedia as a graph. That is, a weight of an edge represents how similar two articles are. In one implementation, a quantitative similarity metric can be a score indicating how many outbound links the two articles have in common.

As part of the retrieval of structured content, the Wikipedia graph can then be traversed in a manner that can suggest, based on a path through edges indicating "similar" articles, interesting connections between a topic and/or recognized entity and other topics and/or entities.

Figure 8:
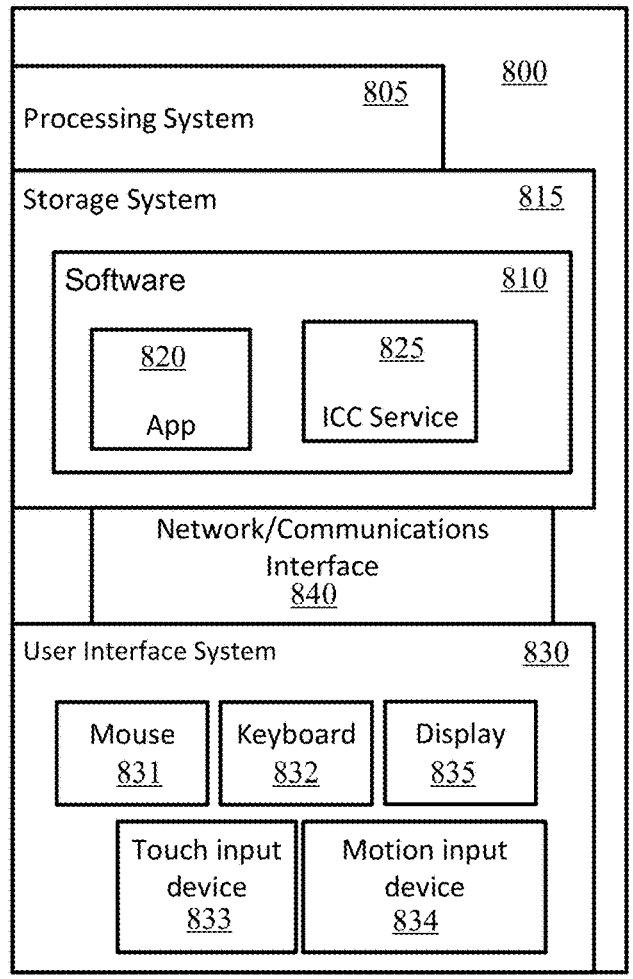
FIG. 8 illustrates components of a computing device that may be used in certain implementations described herein.

FIG. 8 illustrates components of a computing device that may be used in certain implementations described herein.

Referring to FIG. 8, system 800 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 800 may be incorporated to implement a particular computing device.

System 800 includes a processing system 805 of one or more processors to transform or manipulate data according to the instructions of software 810 stored on a storage system 815. Examples of processors of the processing system 805 include general purpose central processing units, application specific processors, and logic devices, as well as any other type of processing device, combinations, or variations thereof. The processing system 805 may be, or is included in, a system-on-chip (SoC) along with one or more other components such as network connectivity components, sensors, video display components.

Storage system 815 may comprise any computer readable storage media readable by the processing system 805 and capable of storing software 810 including the productivity application 820 and optional ICC service components 825.

Storage system 815 may include volatile and nonvolatile, removable and non-removable media implemented in any method or technology for storage of information, such as computer readable instructions, data structures, program modules, or other data. Examples of storage media of storage system 815 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium (or media) a propagated signal or carrier wave.

Storage system 815 may be implemented as a single storage device but may also be implemented across multiple storage devices or sub-systems co-located or distributed relative to each other. Storage system 815 may include additional elements, such as a controller, capable of communicating with processing system 805.

The software 810 can include an operating system (not shown). Device operating systems generally control and coordinate the functions of the various components in the computing device, providing an easier way for applications to connect with lower level interfaces like the networking interface. Non-limiting examples of operating systems include Windows® from Microsoft Corp., Apple® iOS™ from Apple, Inc., Android® OS from Google, Inc., and the Ubuntu variety of the Linux OS from Canonical. It should be noted that the operating system may be implemented both natively on the computing device and on software virtualization layers running atop the native device operating system (OS). Virtualized OS layers, while not depicted in FIG. 8, can be thought of as additional, nested groupings within the operating system space, each containing an OS, application programs, and APIs.

Software 810 can further include application programs such as a productivity application 820 that can communicate with an ICC service, and, in some cases, part or all of the components of an ICC service 825 such as described with respect to components 401, 402, and 403 of FIG. 4 (along with instructions to perform processes 300 and 500) and service 120 of FIG. 1. The productivity application 820 can be configured to provide requests to an ICC service that is remote (e.g., via the Internet) or local (e.g., ICC service 825) and receive results of a performed request from the ICC service.

Software 810 may be implemented in program instructions and among other functions may, when executed by system 800 in general or by processing system 805 in particular, direct system 800 or the one or more processors of processing system 805 to operate as described herein.

The system can further include user interface system 830, which may include input/output (I/O) devices and components that enable communication between a user and the system 800. User interface system 830 can include input devices such as a mouse 831, track pad (not shown), keyboard 832, a touch device 833 for receiving a touch gesture from a user, a motion input device 834 for detecting non-touch gestures and other motions by a user, a microphone for detecting speech (not shown), and other types of input devices and their associated processing elements capable of receiving user input.

The user interface system 830 may also include output devices such as display screen(s) 835, speakers (not shown), haptic devices for tactile feedback (not shown), and other types of output devices. In certain cases, the input and output devices may be combined in a single device, such as a touchscreen display which both depicts images and receives touch gesture input from the user.

Visual output may be depicted on the display 835 in myriad ways, presenting graphical user interface elements, text, images, video, notifications, virtual buttons, virtual keyboards, or any other type of information capable of being depicted in visual form.

The user interface system 830 may also include user interface software and associated software (e.g., for graphics chips and input devices) executed by the OS in support of the various user input and output devices. The associated software assists the OS in communicating user interface hardware events to application programs using defined mechanisms. The user interface system 830 including user interface software may support a graphical user interface, a natural user interface, or any other type of user interface. For example, the interfaces for the productivity application 820 that communicates with an ICC service described herein may be presented through user interface system 830.

Communications interface 840 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Computing system 800 is generally intended to represent a computing system with which software is deployed and executed in order to implement an application, component, or service for a productivity tool as described herein. In some cases, aspects of computing system 800 may also represent a computing system on which software may be staged and from where software may be distributed, transported, downloaded, or otherwise provided to yet another computing system for deployment and execution, or yet additional distribution.

Figure 9:
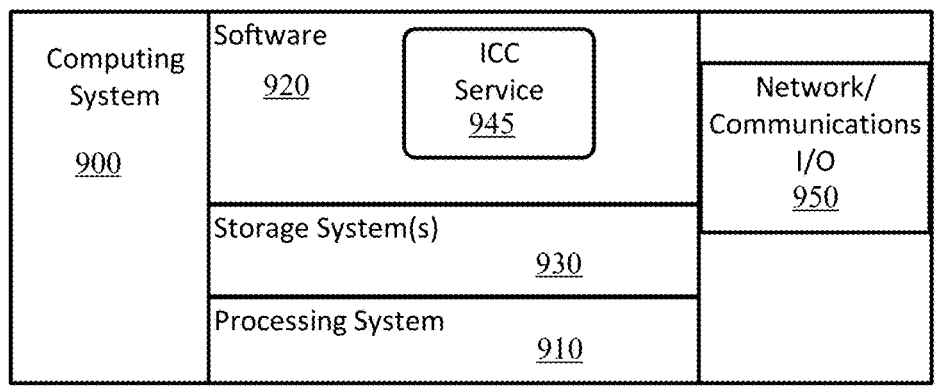
FIG. 9 illustrates components of a computing system that may be used to implement certain methods and services described herein.

FIG. 9 illustrates components of a computing system that may be used to implement certain methods and services described herein. Referring to FIG. 9, system 900 may be implemented within a single computing device or distributed across multiple computing devices or sub-systems that cooperate in executing program instructions. The system 900 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 900 can include a processing system 910, which may include one or more processors and/or other circuitry that retrieves and executes software 920 from storage system 930. Processing system 910 may be implemented within a single processing device but may also be distributed across multiple processing devices or sub-systems that cooperate in executing program instructions.

Storage system(s) 930 can include any computer readable storage media readable by processing system 910 and capable of storing software 920. Storage system 930 may be implemented as a single storage device but may also be implemented across multiple storage devices or sub-systems co-located or distributed relative to each other. Storage system 930 may include additional elements, such as a controller, capable of communicating with processing system 910. Storage system 930 may also include storage devices and/or sub-systems on which data such as entity-related information is stored.

Software 920 may be implemented in program instructions and among other functions may, when executed by system 900 in general or processing system 910 in particular, direct the system 900 or processing system 910 to operate an ICC service 945 as described herein, including the components and processes described with respect to FIGS. 1, 3, 4, and 5.

System 900 may represent any computing system on which software 920, including the ICC service 945, may be staged and from where software 920 may be distributed, transported, downloaded, or otherwise provided to yet another computing system for deployment and execution, or yet additional distribution.

In embodiments where the system 900 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 950 may be included, providing communication connections and devices that allow for communication between system 900 and other computing systems (not shown) over a communication network or collection of networks (not shown) or the air.

Certain techniques set forth herein with respect to searching and storing information through indirect cluster connections may be described in the general context of computer-executable instructions, such as program modules, executed by one or more computing devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), SoC systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

Computer-readable media can be any available computer-readable storage media or communication media that can be accessed by the computer system. Communication media include the media by which a communication signal containing, for example, computer-readable instructions, data structures, program modules, or other data, is transmitted from one system to another system. The communication media can include guided transmission media, such as cables and wires (e.g., fiber optic, coaxial, and the like), and wireless (unguided transmission) media, such as acoustic, electromagnetic, RF, microwave and infrared, that can propagate energy waves. Although described with respect to communication media, carrier waves and other propagating signals that may contain data usable by a computer system are not considered computer-readable "storage media."

By way of example, and not limitation, computer-readable storage media may include volatile and non-volatile, removable and non-removable media implemented in any method or technology for storage of information such as computer-readable instructions, data structures, program modules or other data. Examples of computer-readable storage media include volatile memory such as random access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the term "storage media" consist of carrier waves or propagating signals. It should be understood that storage media and communication media are referring to different media.

Certain aspects of the invention provide the following non-limiting embodiments:

EXAMPLE 1

A method of searching, comprising: receiving a starting topic; identifying at least one starting node in an information graph based on the starting topic; traversing the information graph from a starting node identified by the starting topic to identify indirect connection clusters (ICCs) using a set of specified ICC criteria, wherein an ICC consists of the starting node, a target node that is not directly connected to the starting node, and a connection cluster of connector nodes that indirectly connect the starting node to the target node; and outputting a target article name from the target node of at least one identified ICC.

EXAMPLE 2

The method of example 1, further comprising: for each ICC identified during the traversing of the information graph, storing the target article name corresponding to the target node and at least one connector article name from the connection cluster in a list.

EXAMPLE 3

The method of example 2, further comprising storing, as an entry in the list, at least one of a link overlap score, number of edges connected to each connector node in the connection cluster, and direction of each of the edges for each connector node.

EXAMPLE 4

The method of any of examples 1-3, wherein receiving the starting topic comprises: receiving content input by a user in a productivity application; and identifying the starting topic from the content.

EXAMPLE 5

The method of any of examples 1-4, further comprising: determining link overlap scores between pairs of nodes when traversing the information graph.

EXAMPLE 6

The method of example 5, wherein determining the link overlap scores between pairs of nodes comprises: calculating a link overlap score $L_{A,B}$ between two nodes A and B by using:

$$L_{A,B} = \frac{size(S_A \cap S_B)}{size(min(S_A, S_B))}, \text{ or}$$

$$L_{A,B} = \frac{size(S_A \cap S_B)}{size(max(S_A, S_B))}, \text{ or}$$

$$L_{A,B} = \frac{size(S_A \cap S_B)}{size(S_A)}, \text{ or}$$

$$L_{A,B} = size(S_A \cap S_B),$$

where $S_A$ is a set of outbound links from node A, $S_B$ is a set of outbound links from node B, size(x) finds a size of set x, $min(S_A, S_B)$ returns a smaller of the two sets, and $max(S_A, S_B)$ returns a larger of the two sets.

EXAMPLE 7

The method of any of examples 1-6, further comprising creating the information graph, wherein creating the information graph comprises: representing an article as a node identified at least with a title; representing a link from one article to another article as an edge, the edge indicating directionality of the link; and assigning a weight to the edge, the weight representing a link overlap and having a value corresponding to a link overlap score.

EXAMPLE 8

The method of any of examples 1-7, further comprising: outputting, with the target article name, a portion of text from at least one connector article from a connector node of the connection cluster, wherein the portion of text is a portion of text surrounding a link connecting the connector article represented by the connector node to a starting article represented by the starting node, the target article represented by the target node, or both.

EXAMPLE 9

The method of any of examples 1-8, further comprising: refining the ICCs identified during the traversing of the information graph to generate a reduced set of ICCs from which the target article name is output.

EXAMPLE 10

The method of example 9, wherein refining the ICCs identified during the traversing of the information graph comprises: eliminating ICCs identified during the traversing of the information graph based on a set of refining considerations, wherein the set of refining considerations includes one or more of: a number of connections for one or more of the nodes of the ICC; direction of one or more of the connections of a particular one or more nodes of the ICC; a number of connections in a particular direction to or from a node; a relative size of one or more nodes; a proximity of entities within an article represented by a node of the ICC, where the entities correspond to titles or topics which have a link in the article represented by the node of the ICC and are represented by the connector nodes; and a link overlap score threshold.

EXAMPLE 11

The method of example 10, further comprising: ranking the ICCs of the reduced set of ICCs and providing the ranking.

EXAMPLE 12

The method of example 11, wherein the ranking of the ICCs is performed according to at least one of: link overlap score, node size, the proximity of entities within the article, and number of occurrences of the target node.

EXAMPLE 13

The method of any of examples 1-12, wherein the set of specified ICC criteria includes at least one clique attribute such as clique size.

EXAMPLE 14

The method of example 13, wherein each node in the connection cluster connects to both the starting node and the target node, the clique size represents a total number of nodes in the connection cluster and there are no other nodes outside the connection cluster that also connect to both the starting node and the target node.

EXAMPLE 15

The method of example 13 or 14, wherein each node of the connection cluster connects to each other.

EXAMPLE 16

A system for suggesting an indirectly related topic to a user, the system comprising: a processor; one or more computer readable storage media; and program instructions for performing a method of searching stored on the one or more computer readable storage media that when executed by a processing system, direct the processing system to: identify at least one starting node in an information graph based on a starting topic; traverse the information graph from a starting node identified by the starting topic to identify indirect connection clusters (ICCs) using a set of specified ICC criteria, wherein an ICC consists of the starting node, a target node that is not directly connected to the starting node, and a connection cluster of nodes that indirectly connect the starting node to the target node; and output a target article name from the target node of at least one identified ICC.

EXAMPLE 17

The system of example 16, wherein for each ICC identified while the processing system is executing the instructions to traverse the information graph, the instructions direct the processing system to store the target article name corresponding to the target node and at least one connector article name from the connection cluster in a list.

EXAMPLE 18

The system of example 16 or 17, further comprising an application programming interface for the instructions for performing the method of searching that direct the processing system to perform the method of searching in response to receiving the starting topic.

EXAMPLE 19

The system of any of examples 16-18, wherein the instructions further direct the system to: output, with the target article name, a portion of text from at least one connector article from a connector node of the connection cluster, wherein the portion of text is a portion of text surrounding a link connecting the connector article represented by the connector node to one or both of a starting article represented by the starting node or the target article represented by the target node.

EXAMPLE 20

The system of any of examples 16-19, wherein the set of specified ICC criteria includes at least one clique attribute such as clique size.

EXAMPLE 21

The system of example 20, wherein each node in the connection cluster connects to both the starting node and the target node, the clique size represents a total number of nodes in the connection cluster and there are no other nodes outside the connection cluster that also connect to both the starting node and the target node.

EXAMPLE 22

The system of example 20 or 21, wherein each node of the connection cluster connects to each other.

EXAMPLE 23

The system of example 20 or 21, wherein the connection cluster consists of nodes that connect to only two other nodes or the connection cluster consists of nodes that connect to one central node.

EXAMPLE 24

One or more computer readable storage media having instructions stored thereon that, when executed by a processing system, direct the processing system to: in response to receiving a request for relevant content of an online encyclopedia or linked articles, search an information graph representing the online encyclopedia or linked articles for relevant content not directly connected to a starting topic identified from the request, wherein the instructions to search the information graph direct the processing system to: identify indirect connection clusters (ICCs) corresponding to the starting topic associated with the request, wherein an ICC consists of the starting node, a target node that is not directly connected to the starting node, and a connection cluster of connector nodes that indirectly connect the starting node to the target node; refine the identified ICCs to eliminate certain ICCs and generate a refined set of ICCs; and rank ICCs within the refined set of ICCs.

EXAMPLE 25

The media of example 24, wherein the instructions to refine the identified ICCs to eliminate certain ICCs and generate a refined set of ICCs direct the processing system to: eliminate ICCs from the ICCs based on a set of refining considerations, wherein the set of refining considerations includes one or more of: a number of connections for one or more of the nodes of the ICC; direction of one or more of the connections of a particular one or more nodes of the ICC; a number of connections in a particular direction to or from a node; a relative size of one or more nodes; a proximity of entities within an article represented by a node of the ICC, where the entities correspond to titles or topics which have a link in the article represented by the node of the ICC and are represented by the connector nodes; and a link overlap score threshold.

EXAMPLE 26

The media of example 24 or 25, wherein the instructions to rank the ICCs within the refined set of ICCs direct the processing system to: rank ICCs within the refined set of ICCs based on at least one of: link overlap score, node size, the proximity of entities within the article, and number of occurrences of the target node.

EXAMPLE 27

The media of any of examples 24-26, further comprising instructions that direct the processing system to: output a list comprising target article names corresponding to the target nodes of the ranked ICCs.

EXAMPLE 28

The media of any of examples 16-19, wherein the set of specified ICC criteria includes at least one clique attribute such as clique size.

EXAMPLE 29

The media of example 20, wherein each node in the connection cluster connects to both the starting node and the target node, the clique size represents a total number of nodes in the connection cluster and there are no other nodes outside the connection cluster that also connect to both the starting node and the target node.

EXAMPLE 30

The media of example 20 or 21, wherein each node of the connection cluster connects to each other.

EXAMPLE 31

The media of example 20 or 21, wherein the connection cluster consists of nodes that connect to only two other nodes or the connection cluster consists of nodes that connect to one central node.

EXAMPLE 32

A method of creating an information graph, comprising: representing an article as a node identified at least with a title; representing a link from one article to another article as an edge, the edge indicating directionality of the link; and assigning a weight to the edge, the weight representing a link overlap and having a value corresponding to a link overlap score.

EXAMPLE 33

The method of example 32, further comprising calculating the link overlap score $L_{A,B}$ between two nodes A and B by using a formula selected from one of:

$$L_{A,B} = \frac{size(S_A \cap S_B)}{size(min(S_A, S_B))}, \text{ or}$$

$$L_{A,B} = \frac{size(S_A \cap S_B)}{size(max(S_A, S_B))}, \text{ or}$$

$$L_{A,B} = \frac{size(S_A \cap S_B)}{size(S_A)}, \text{ or}$$

$$L_{A,B} = size(S_A \cap S_B),$$

where $S_A$ is a set of outbound links from node A, $S_B$ is a set of outbound links from node B, size(x) finds a size of set x, $min(S_A, S_B)$ returns a smaller of the two sets, and max $(S_A, S_B)$ returns a larger of the two sets.

EXAMPLE 34

The method of example 32 or 33, wherein the link overlap score represents a score of how many outbound links a set of articles have in common.

EXAMPLE 35

The method of any of examples 32-34 wherein the link from one article to another article is a hyperlink.

EXAMPLE 36

The method of any of examples 32-35, further comprising including metadata with each node, wherein the metadata includes at least one or more of: an article length, a number of sections, date information associated with an article, an author, a title of each section in an article, and image information.

EXAMPLE 37

One or more computer readable storage media having instructions stored thereon that, when executed by a processing system, direct the processing system to: in response to receiving a command for relevant content via a user interface at a computing device, the request comprising a topic, communicate a request to an ICC service for at least one target article and corresponding one or more connecting topics; receive the at least one target article and corresponding one or more connecting topics; and return content, for display, from the at least one target article and the corresponding one or more connecting topics.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of searching, comprising:
   receiving a starting topic;
   identifying at least one starting node in an information graph based on the starting topic;
   determining at least one target node based on the at least one starting node identified by the starting topic by:
      traversing the information graph to identify all groupings of nodes that satisfy a set of indirect connection cluster (ICC) criteria for an ICC, wherein the set of ICC criteria comprises:
         a criterion that the ICC consists of the starting node, two or more connector nodes that are each a single hop from the starting node, and a terminating node that is a single hop from each of the two or more connector nodes and two hops from the starting node, the terminating node being a target node; and
         a criterion that the starting node and the target node are not connected by a single hop; and
      determining a link overlap score between pairs of nodes when traversing the information graph;
   identifying a target article name from a corresponding target node identified in a grouping of nodes that satisfies the set of ICC criteria; and
   outputting the target article name.

2. The method of claim 1, further comprising:
   for each target node identified during the traversing of the information graph, storing the target article name corresponding to the target node and at least one connector article name from the two or more connector nodes in a list.

3. The method of claim 2, further comprising storing, as an entry in the list, at least one of the link overlap score, number of edges connected to each of the two or more connector nodes, and direction of each of the edges for each of the two or more connector nodes.

4. The method of claim 1, wherein receiving the starting topic comprises: receiving content input by a user in a productivity application; and identifying the starting topic from the content.

5. The method of claim 1, wherein the set of ICC criteria further comprises a clique size, wherein the clique size represents a total number of connector nodes in the ICC and there are no other nodes outside the connector nodes of the total number of connector nodes in the ICC that also connect to both the starting node and the target node by a single hop.

6. The method of claim 1, further comprising:
   storing a list of identified ICCs, each ICC indicating its corresponding target article name, the link overlap scores between the target node and the connector nodes, a directionality between the target node and each connector node, or a combination thereof.

7. The method of claim 1, further comprising creating the information graph, wherein creating the information graph comprises:
   representing an article as a node identified at least with a title;
   representing a link from one article to another article as an edge, the edge indicating directionality of the link; and
   assigning a weight to the edge, the weight representing a link overlap and having a value corresponding to a link overlap score.

8. The method of claim 1, further comprising:
   outputting, with the target article name, a portion of text from at least one connector article from a connector node of the two or more connector nodes, wherein the portion of text is a portion of text surrounding a link connecting the connector article represented by the connector node to a starting article represented by the starting node, the target article represented by the target node, or both.

9. The method of claim 1, further comprising:
   refining the ICCs identified during the traversing of the information graph to generate a reduced set of ICCs from which the target article name is output.

10. The method of claim 9, wherein refining the ICCs identified during the traversing of the information graph comprises:
    eliminating ICCs identified during the traversing of the information graph based on a set of refining considerations, wherein the set of refining considerations includes one or more of:
       a number of connections for one or more of the nodes of the ICC;
       direction of one or more of the connections of a particular one or more nodes of the ICC;
       a number of connections in a particular direction to or from a node;
       a relative size of one or more nodes;
       a proximity of entities within an article represented by a node of the ICC, wherein the entities correspond to titles or topics which have a link in the article represented by the node of the ICC and are represented by the two or more connector nodes of that ICC; and
a link overlap score threshold.

11. The method of claim 10, further comprising:
ranking the ICCs of the reduced set of ICCs and providing the ranking.

12. The method of claim 11, wherein the ranking of the ICCs is performed according to at least one of: link overlap score, node size, the proximity of entities within the article, and number of occurrences of the target node.

13. A system for suggesting an indirectly related topic to a user, the system comprising:
a processor;
one or more computer readable storage media; and
program instructions for performing a method of searching stored on the one or more computer readable storage media that when executed by a processing system, direct the processing system to:
identify at least one starting node in an information graph based on a starting topic;
determine at least one target node based on the at least one starting node identified by the starting topic by:
traversing the information graph to identify all groupings of nodes that satisfy a set of indirect connection cluster (ICC) criteria for an ICC, wherein the set of ICC criteria comprises:
a criterion that the ICC consists of the starting node, two or more connector nodes that are each a single hop from the starting node, and a terminating node that is a single hop from each of the two or more connector nodes and two hops away from the starting node, the terminating node being a target node; and
a criterion that the starting node and the target node are not connected by a single hop; and
determining a link overlap score between pairs of nodes when traversing the information graph;
identify a target article name from a corresponding target node identified in a grouping of nodes that satisfies the set of ICC criteria; and
output the target article name.

14. The system of claim 13, wherein for each target node identified while the processing system is executing the instructions to traverse the information graph, the instructions direct the processing system to store the target article name corresponding to the target node and at least one connector article name from the two or more connector nodes in a list.

15. The system of claim 13, further comprising an application programming interface for the instructions for performing the method of searching that direct the processing system to perform the method of searching in response to receiving the starting topic.

16. The system of claim 13, wherein the instructions further direct the system to:
output, with the target article name, a portion of text from at least one connector article from a connector node of the two or more connector nodes, wherein the portion of text is a portion of text surrounding a link connecting the connector article represented by the connector node to one or both of a starting article represented by the starting node or the target article represented by the target node.

17. One or more computer readable storage media having instructions stored thereon that, when executed by a processing system, direct the processing system to:
in response to receiving a request for relevant content of an online encyclopedia or linked articles, search an information graph representing the online encyclopedia or linked articles for relevant content not directly connected to a starting topic identified from the request, wherein the instructions to search the information graph direct the processing system to:
traverse the information graph to identify all groupings of nodes that satisfy a set of indirect connection cluster (ICC) criteria corresponding to the starting topic associated with the request, wherein the ICC criteria comprises:
a criterion that the ICC consists of the starting node, two or more connector nodes that are each a single hop from the starting node, and a terminating node that is a single hop from each of the two or more connector nodes and two hops away from the starting node, the terminating node being the target node; and
a criterion that the starting node and the target node are not connected by a single hop; and
determining a link overlap score between pairs of nodes when traversing the information graph;
refine the identified ICCs to eliminate certain ICCs and generate a refined set of ICCs; and
rank ICCs within the refined set of ICCs.

18. The media of claim 17, wherein the instructions to refine the identified ICCs to eliminate certain ICCs and generate a refined set of ICCs direct the processing system to:
eliminate ICCs from the ICCs based on a set of refining considerations, wherein the set of refining considerations includes one or more of:
a number of connections for one or more of the nodes of the ICC;
direction of one or more of the connections of a particular one or more nodes of the ICC;
a number of connections in a particular direction to or from a node;
a relative size of one or more nodes;
a proximity of entities within an article represented by a node of the ICC, wherein the entities correspond to titles or topics which have a link in the article represented by the node of the ICC and are represented by the two or more connector nodes of that ICC; and
a link overlap score threshold.

19. The media of claim 17, wherein the instructions to rank the ICCs within the refined set of ICCs direct the processing system to:
rank ICCs within the refined set of ICCs based on at least one of: the link overlap score, a node size, the proximity of entities within the article, and number of occurrences of the target node.

20. The media of claim 17, further comprising instructions that direct the processing system to:
output a list comprising target article names corresponding to the target nodes of the ranked ICCs.

* * * * *